(12) United States Patent
Ushioda et al.

(10) Patent No.: US 11,181,951 B1
(45) Date of Patent: Nov. 23, 2021

(54) INFORMATION DEVICE SYSTEM AND INPUT DEVICE

(71) Applicant: LENOVO (SINGAPORE) PTE. LTD., Singapore (SG)

(72) Inventors: Tatsuya Ushioda, Yokohama (JP); Muneki Sugiyama, Yokohama (JP); Yoshiki Hiranouchi, Yokohama (JP); Hiroaki Nukaga, Yokohama (JP); Hiroaki Kinoshita, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/134,310

(22) Filed: Dec. 26, 2020

(30) Foreign Application Priority Data

Oct. 19, 2020 (JP) .............................. JP2020-175335

(51) Int. Cl.
*G06F 1/16* (2006.01)
*G06F 3/02* (2006.01)

(52) U.S. Cl.
CPC .......... *G06F 1/1681* (2013.01); *G06F 1/1637* (2013.01); *G06F 3/0202* (2013.01)

(58) Field of Classification Search
CPC .... G06F 1/1681; G06F 1/1637; G06F 3/0202; G06F 1/1652; G06F 1/1616; G06F 1/1641; H04M 1/0268
See application file for complete search history.

(56) References Cited

U.S. PATENT DOCUMENTS

2015/0241925 A1* 8/2015 Seo ........................ G06F 1/1681
361/679.27
2021/0168952 A1* 6/2021 Ko ........................ H05K 5/0017

FOREIGN PATENT DOCUMENTS

JP 2018112835 A 7/2018

* cited by examiner

*Primary Examiner* — Abbas I Abdulselam
(74) *Attorney, Agent, or Firm* — Shimokaji IP

(57) ABSTRACT

An information device system includes a portable information device to which a first chassis and a second chassis are connected, and a keyboard. The portable information device has a foldable display, and a pair of cover plate parts covering a hinge device at both sides, a tip surface being disposed at a position projecting to an inner side in a bending direction of the display than a surface of a bending part of the display as the first chassis and the second chassis rotate. The keyboard has a width along one edge portions equal to or larger than an interval at which the pair of cover plate parts is provided, based on a placement state of being placed at a usage position specified by a top surface of the first chassis, and is provided with an elastic member at corner parts opposed to the pair of cover plate parts.

8 Claims, 14 Drawing Sheets

INFORMATION DEVICE SYSTEM AND INPUT DEVICE

FIELD OF THE INVENTION

The present invention relates to an information device system having an information device to which a first chassis and a second chassis are connected and an input device used in combination with the information device, and the input device.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, the present applicant has proposed a portable information device in which not only a chassis but also a display is configured so as to be foldable by the use of a flexible display, such as organic EL (Electro Luminescence) (for example, refer to Japanese Patent No. 6,507,183).

SUMMARY OF THE INVENTION

Even for the information device as described above, some users may want to input using an input device such as a physical keyboard. The input device as used in combination with the information device should preferably be formed into a thin plate shape and held between the first chassis and the second chassis when the information device is in a folded state so that portability can be achieved in an integrated manner.

However, in the information device as described above, a display is provided over a top surface of the first chassis and that of the second chassis, and thus, when the information device falls or the input device held between the first chassis and the second chassis is shifted from a proper holding position, there are concerns that the input device abuts against a bending part of the display to damage the display.

The present invention has been made in view of the above-described problem and has an object to provide an information device system which prevents a sub-device from damaging a display of a main device to which a first chassis and a second chassis are connected and an input device as the sub-device.

In order to solve the above-mentioned problem and achieve the object, the information device system according to the first aspect of the present invention is an information device system including a main device to which a first chassis and a second chassis are connected, and a plate-shaped sub-device to be used in combination with the main device, in which the main device has: a hinge configured to rotatably connect respective one edge portions of the first chassis and the second chassis; a foldable display seamlessly covering the first chassis and the second chassis; and a pair of plate pieces covering at least a part of an outside of the hinge at both sides of the one edge portions, the pair of plate pieces being contained in the first chassis and the second chassis in a state where a top surface of the first chassis and a top surface of the second chassis are in substantially the same plane, each tip surface in a bending direction of the display projecting to an inner side in the bending direction than a surface of a bending part of the display as the first chassis and the second chassis rotate, and the sub-device has a width along the one edge portions equal to or larger than an interval at which the pair of plate pieces is provided, based on a placement state of being placed at a usage position specified by the top surface of the first chassis, and is provided with an elastic member at locations opposed to the pair of plate pieces.

According to the first aspect, the pair of plate pieces of the main device projects as the first chassis and the second chassis rotate, while the sub-device is provided with the elastic member at locations opposed to the pair of plate pieces. Therefore, even if the sub-device is moved in a direction of approaching the bending center from a specified usage position by some impact force, the elastic member abuts against the plate pieces to prevent the sub-device from directly abutting against the display. In addition, since the impact force is mitigated by the elastic member, the display is prevented from being damaged by the sub-device.

The elastic member may be provided over the entire length of a rear edge of the sub-device along the one edge portions based on the placement state and may be formed to be thicker at the locations opposed to the pair of plate pieces than in other locations.

Both end corner parts of the rear edge may be the locations opposed to the pair of the plate pieces and a curvature radius of the elastic member at the both end corner parts may be configured to be smaller than a curvature radius of a body of the sub-device. This can further mitigate an impact force on abutting against the plate pieces or the display.

The sub-device may be positioned at the usage position by a magnet. This makes the positioning of the sub-device easy.

The elastic member may have hollow parts at the locations opposed to the pair of plate pieces. This can further mitigate an impact force on abutting against the plate pieces or the display.

The sub-device may be held between the first chassis and the second chassis while remaining in the placement state, when the first chassis and the second chassis rotate to fold the main device. With this, the sub-device can obtain preferable portability integrated with the main device.

The sub-device may be an input device configured to wirelessly communicate with the main device when it is in the placement state. This makes it possible for the sub-device to input without any particular electrical connection operation.

In addition, in order to solve the above-mentioned problem and achieve the object, the input device according to the second aspect of the present invention is a plate-shaped input device to be used in combination with a main device to which a first chassis and a second chassis are connected, the main device has: a hinge configured to rotatably connect respective one edge portions of the first chassis and the second chassis; a foldable display seamlessly covering the first chassis and the second chassis; and a pair of plate pieces covering at least a part of an outside of the hinge at both sides of the one edge portions, the pair of plate pieces being contained in the first chassis and the second chassis in a state where a top surface of the first chassis and a top surface of the second chassis are in substantially the same plane, each tip surface in a bending direction of the display projecting to an inner side in the bending direction than a surface of a bending part of the display as the first chassis and the second chassis rotate, and a width along the one edge portions is equal to or larger than an interval at which the pair of plate pieces is provided, based on a placement state of being placed at a usage position specified by the top surface of the first chassis of the main device, and an elastic member is provided at locations opposed to the pair of plate pieces.

According to the second aspect, the pair of plate pieces of the main device projects as the first chassis and the second chassis rotate, while the input device is provided with the elastic member at locations opposed to the pair of plate pieces. Therefore, even if the input device is moved in a direction of approaching the bending center from a specified usage position by some impact force, the elastic member abuts against the plate pieces to prevent the input device from directly abutting against the display. In addition, since the impact force is mitigated by the elastic member, the display is prevented from being damaged by the input device.

According to the above-described aspects of the present invention, it is possible to prevent the sub-device such as the input device from damaging the display of the main device to which the first chassis and the second chassis are connected.

DETAILED DESCRIPTION OF THE INVENTION

Hereinafter, embodiments of an information device system and an input device according to the present invention are described in detail based on the drawings. It is to be noted that the present invention is not limited by the embodiments.

An information device system 11 (refer to FIG. 8) according to one embodiment of the present invention includes a portable information device 10 as a main device and a keyboard 60 as a sub-device that is used in combination with the portable information device 10. In addition, the keyboard 60 corresponds to the input device according to one embodiment of the present invention.

Figure 1:
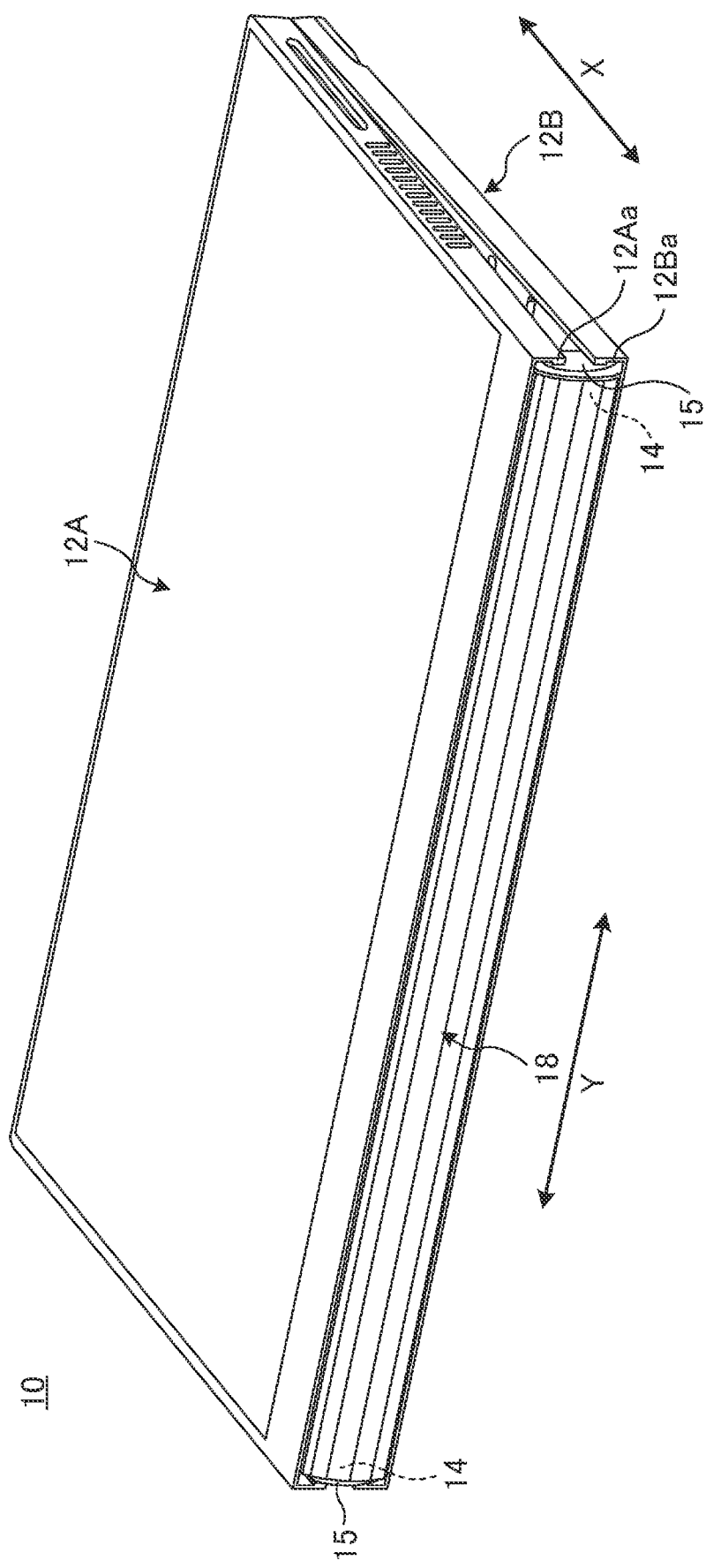
FIG. 1 is a perspective view illustrating a state where a portable information device is closed into a storage form.
Figure 2:
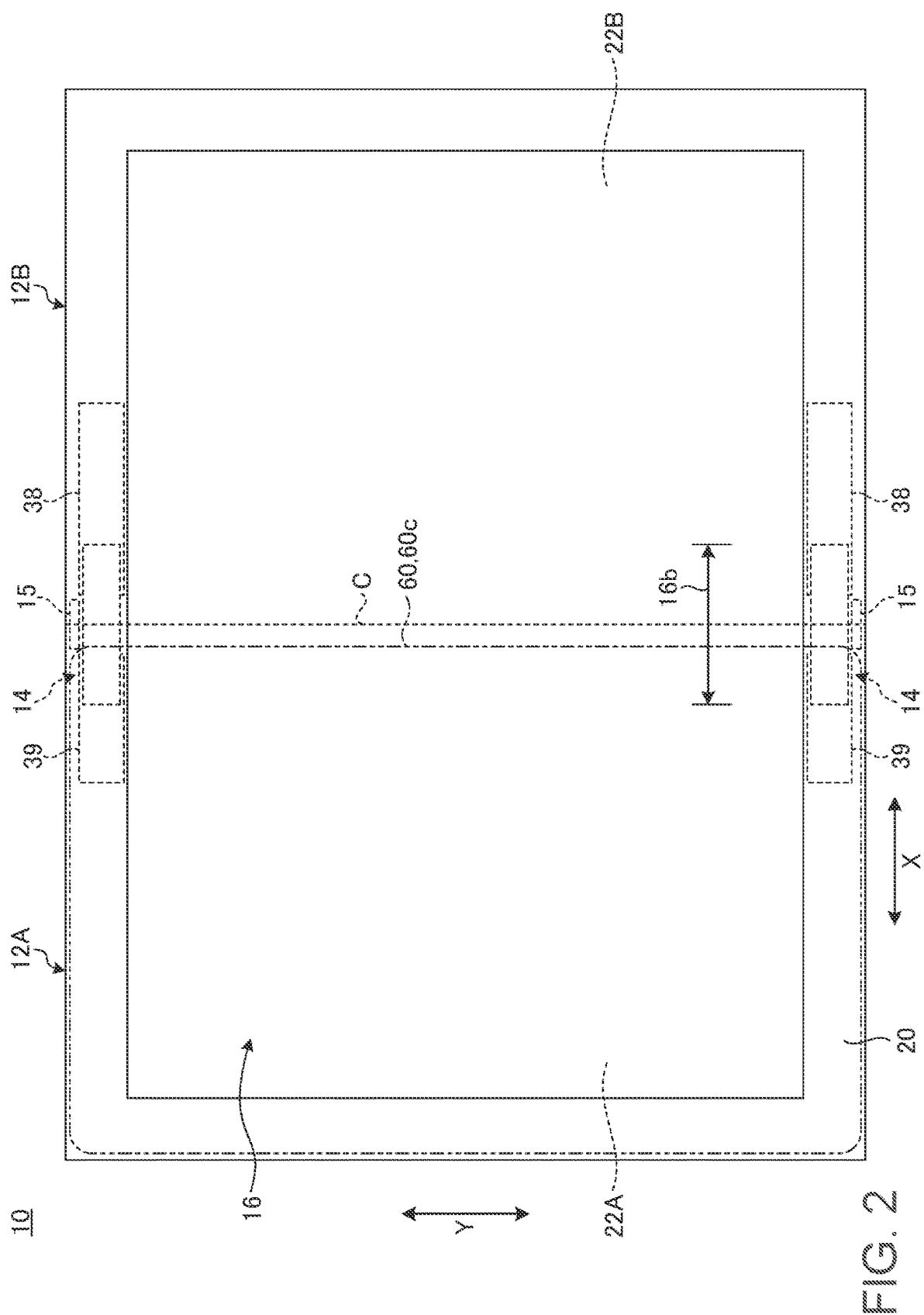
FIG. 2 is a perspective view schematically illustrating a state where the portable information device illustrated in FIG. 1 is opened into a usage form.
Figure 3:
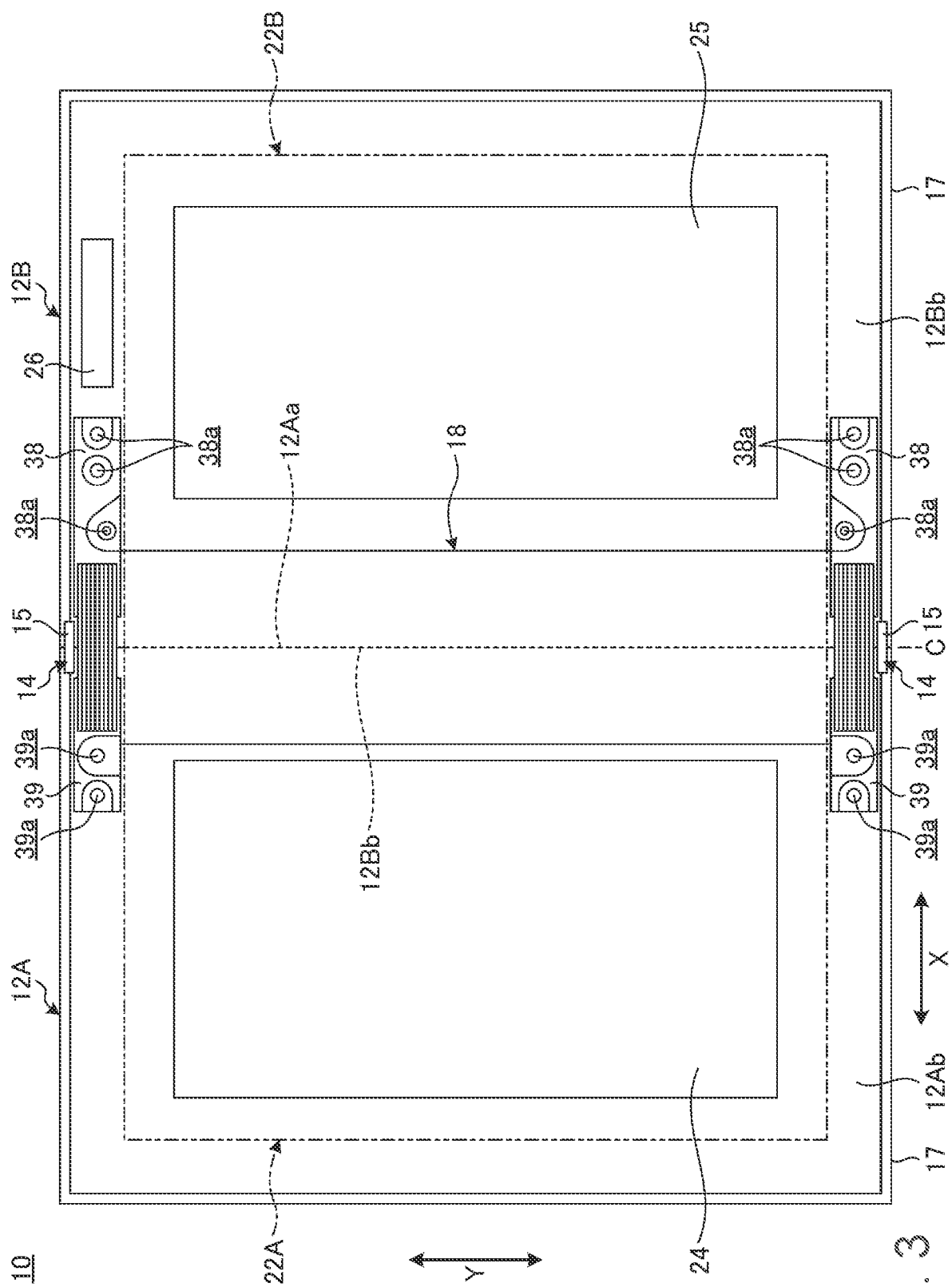
FIG. 3 is a plan view schematically illustrating the internal structure of the portable information device illustrated in FIG. 2.

FIG. 1 is a perspective view illustrating a state where the portable information device 10 of the information device system 11 is closed into a storage form. FIG. 2 is a plan view schematically illustrating a state where the portable information device 10 illustrated in FIG. 1 is opened into a usage form. FIG. 3 is a plan view schematically illustrating the internal structure of the portable information device 10 illustrated in FIG. 2.

As illustrated in FIG. 1 to FIG. 3, the portable information device 10 includes a first chassis 12A, a second chassis 12B, a hinge device 14, a cover member 15, and a display 16. The portable information device 10 according to the present embodiment is a tablet PC foldable like a book. The portable information device 10 may be a cellular phone, a smartphone, an electronic notebook, or a portable game console, etc.

The chassis 12A and 12B are each rectangular flat box body in which side plates 17 are formed so as to be raised on four peripheries of the bottom plate (refer to FIG. 3) and the display 16 is disposed on an opened top surface. The chassis 12A and 12B are each composed of metal plates of stainless steel, magnesium, and aluminum etc., fiber reinforced resin plates containing reinforced fibers, such as carbon fibers, or the like, for example.

The chassis 12A and 12B are disposed adjacent to each other. The chassis 12A and 12B are connected through a pair of the hinge devices 14 and 14 provided in both end portions in the Y direction of one edge portions 12Aa and 12Ba as edge portions adjacent to each other. The hinge devices 14 rotatably connect the one edge portions 12Aa and 12Ba of the first chassis 12A and the second chassis 12B so that the second chassis 12B is opened and closed with respect to the first chassis 12A. The chassis 12A and 12B are rotatably connected by the hinge devices 14. The chassis 12A and 12B can be moved to a desired angular position between the storage form illustrated in FIG. 1 and the usage form illustrated in FIG. 2. A line C illustrated by the dashed-dotted line in FIG. 3 represents a bending center C serving as the center of a folding operation of the chassis 12A and 12B. In the storage form illustrated in FIG. 1, the one edge portions 12Aa and 12Ba of the chassis 12A and 12B are greatly separated from each other. Then, a boundary portion between the one edge portions 12Aa and 12Ba is covered by a backbone member 18. It is to be noted that the storage form of the portable information device 10 includes a belowmentioned form in which the keyboard 60 is held between the two chassis 12A and 12B (refer to FIG. 9). In addition, the keyboard 60 placed at a specified usage position is shown in FIG. 2 by a virtual line.

Hereinafter, as illustrated in FIG. 1 to FIG. 3, the portable information device 10 is described designating a direction in which the chassis 12A and 12B are arranged as an X direction and a longitudinal direction of the backbone member 18 perpendicular to the X direction as a Y direction.

As illustrated in FIG. 1 and FIG. 3, the backbone member 18 is attached to inner surfaces 12Ab and 12Bb of the chassis 12A and 12B. The backbone member 18 is a sheet-like member of an accordion shape. One end portion in the X direction of the backbone member 18 is fixed to the first chassis 12A and the other end portion in the X direction is slidably supported by the second chassis 12B, for example.

The display 16 is a touch panel type liquid crystal display, for example. The display 16 is a flexible display, such as an organic EL having a paper structure with high flexibility, for example. The display 16 seamlessly covers display surfaces of the first chassis 12A and the second chassis 12B and is opened/closed with an opening/closing operation of the chassis 12A and 12B. A bezel member 20 is disposed on an outer peripheral edge portion of the surface (display surface) 16a of the display 16 (refer to FIG. 2). The bezel member 20 is a frame-shaped sheet-like member having flexibility. The bezel member 20 covers a non-displaying region (inactive region) of the outer peripheral edge portion excluding a display region (active region) of the surface 16a of the display 16. The bezel member 20 is attached so as to straddle the side plate 17 of the chassis 12A and 12B and the outer peripheral edge portion of the surface 16a of the display 16 (refer to FIG. 2). Thus, the bezel member 20 covers a portion of the display surfaces of the first chassis 12A and the second chassis 12B other than the display 16.

The display 16 is provided over the inner surfaces 12Ab and 12Bb of the chassis 12A and 12B. The display 16 is supported with respect to the inner surfaces 12Ab and 12Bb through a first support plate 22A and a second support plate 22B (refer to FIG. 3). As illustrated by the dashed-two dotted line in FIG. 3, the support plates 22A and 22B are each a thin plate member formed into a rectangular shape. The first support plate 22A is fixed to the first chassis 12A. The second support plate 22B is fixed to the second chassis 12B. The display 16 is fixed to top surfaces of the support plates 22A and 22B using a double-sided tape, or the like. In the display 16, a belt-like region overlapping with the hinge devices 14 serves as a bending region 16b. The bending region 16b is not fixed with respect to the support plates 22A and 22B and is in a relatively movable state (refer to FIG. 7B and FIG. 7C).

The chassis 12A and 12B contain a substrate 24 mounted with various types of semiconductor chips, a battery device 25, an antenna device 26, as well as various types of electronic components, and a cooling device etc., for example. These electronic components etc. are contained in a space formed between the inner surfaces 12Ab and 12Bb and the support plates 22A and 22B.

Figure 4A:
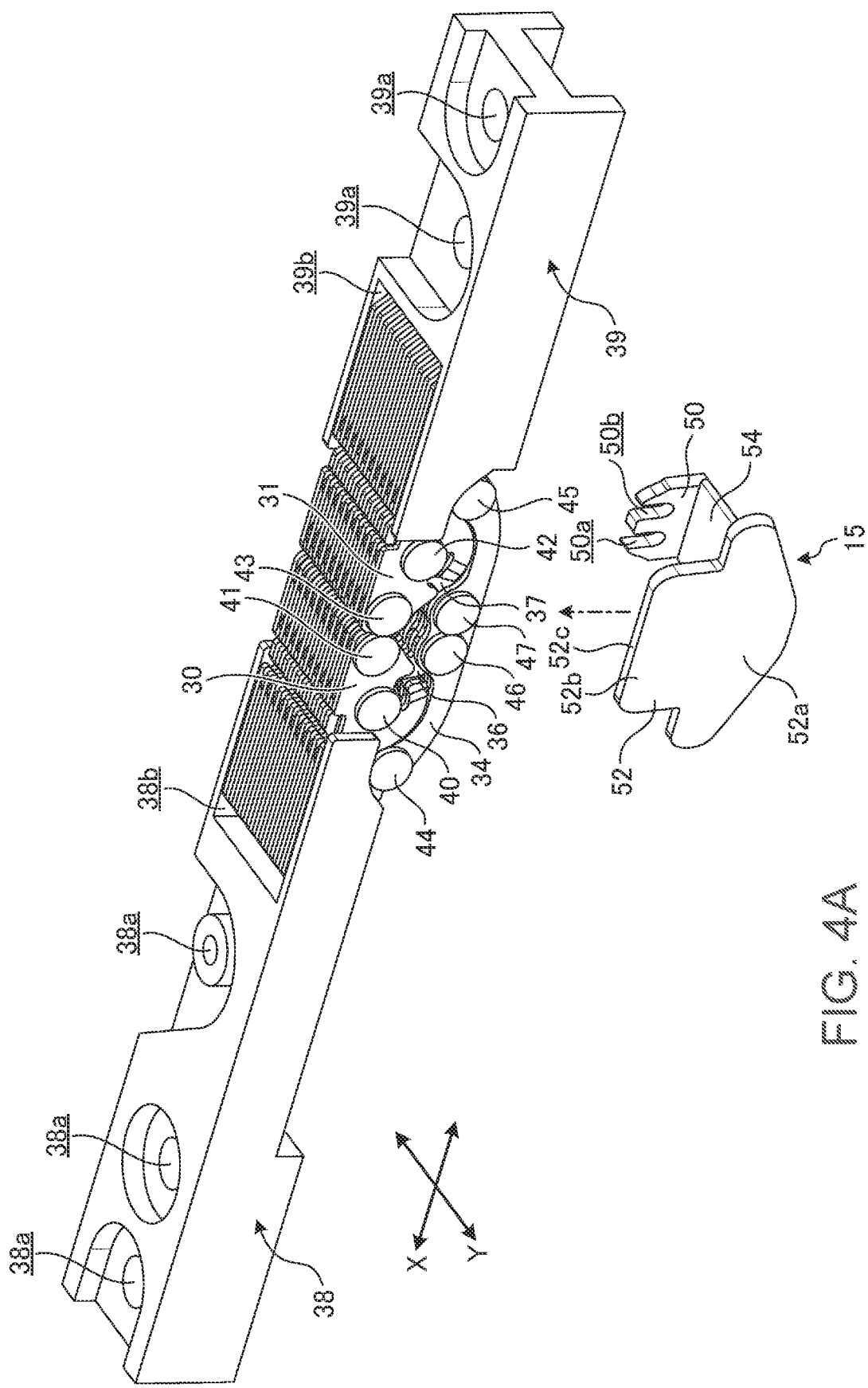
FIG. 4A is an exploded perspective view illustrating a state before a cover member is attached to a hinge device.
Figure 4B:
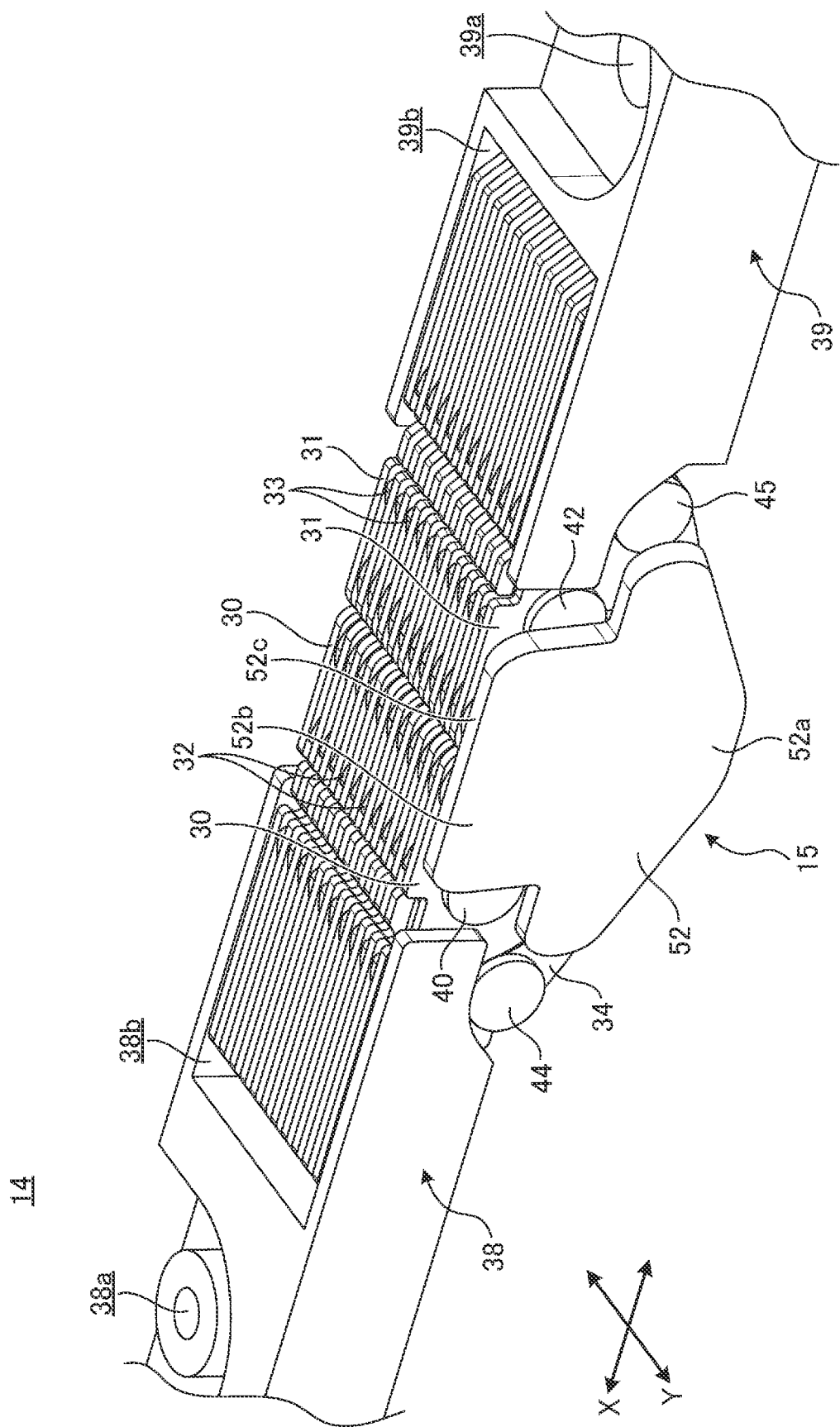
FIG. 4B is a perspective view enlarging the cover member and its surrounding part in a state where the cover member is attached to the hinge device.
Figure 5:
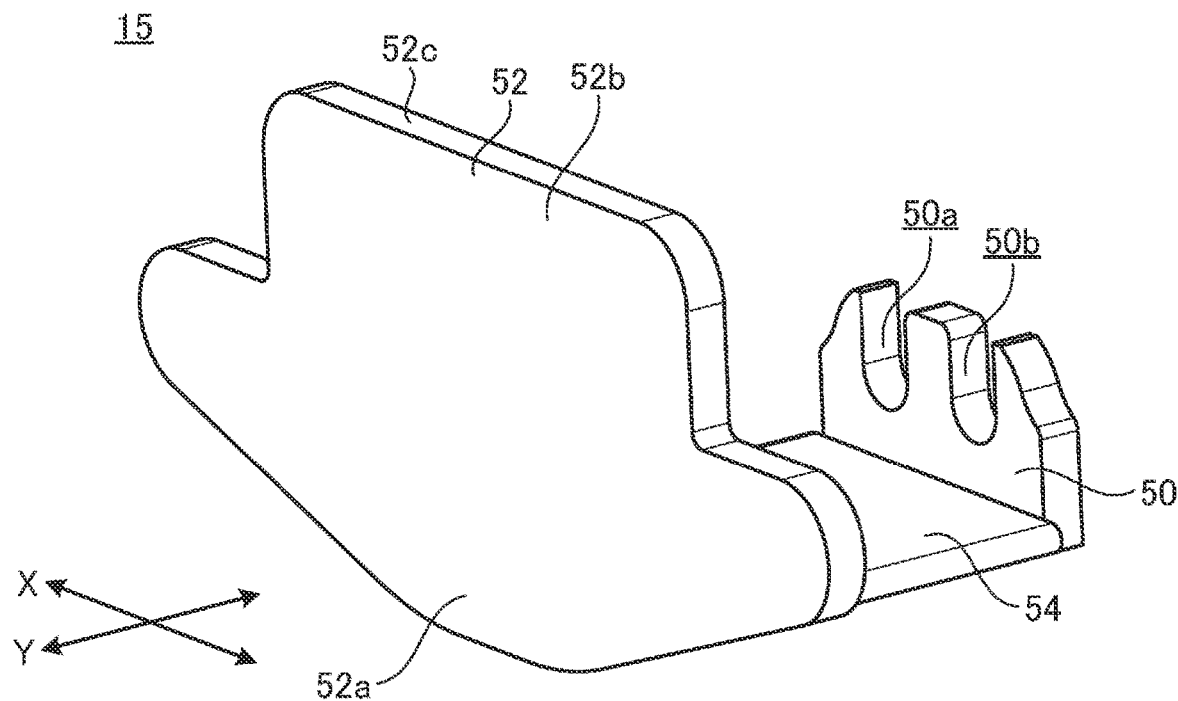
FIG. 5 is a perspective view of the cover member.
Figure 6:
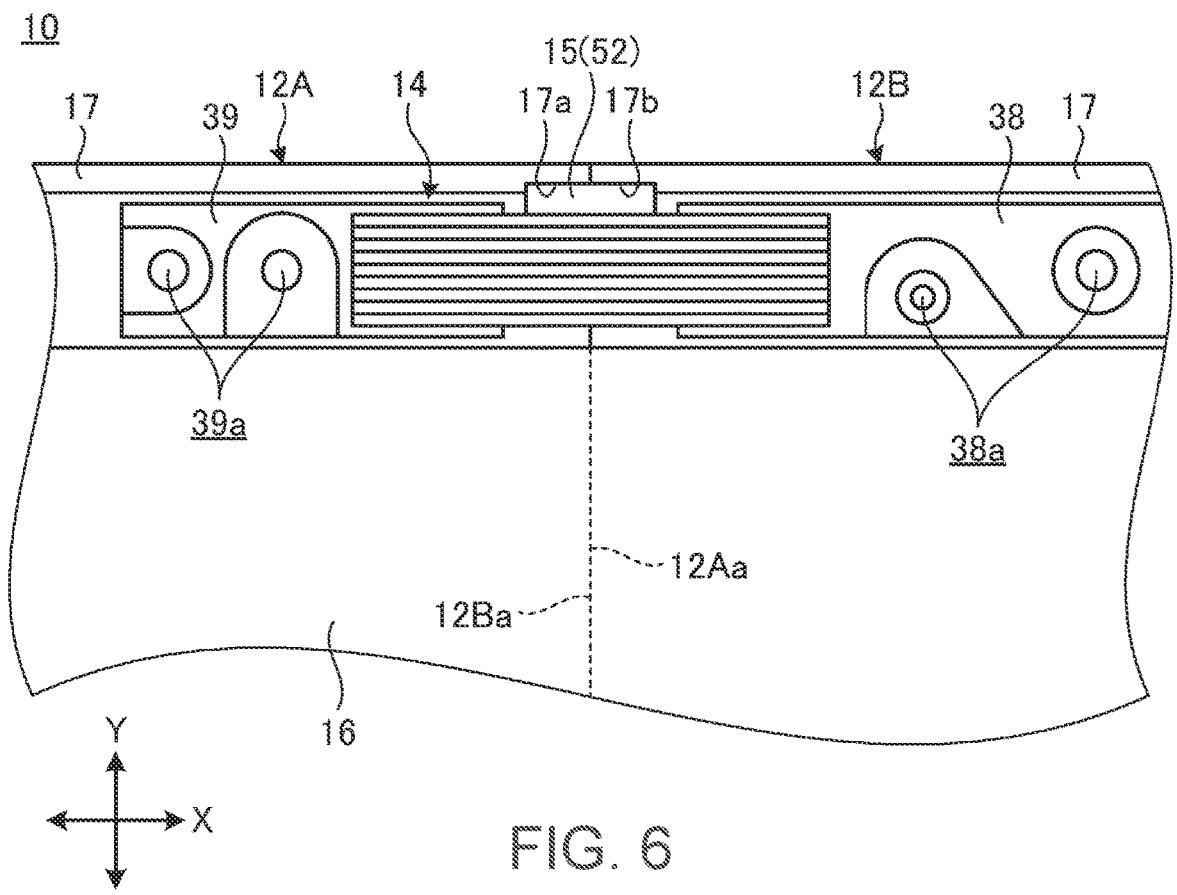
FIG. 6 is a schematic plan view enlarging the hinge device at one end side in the Y direction and its surrounding part.
Figure 7A:
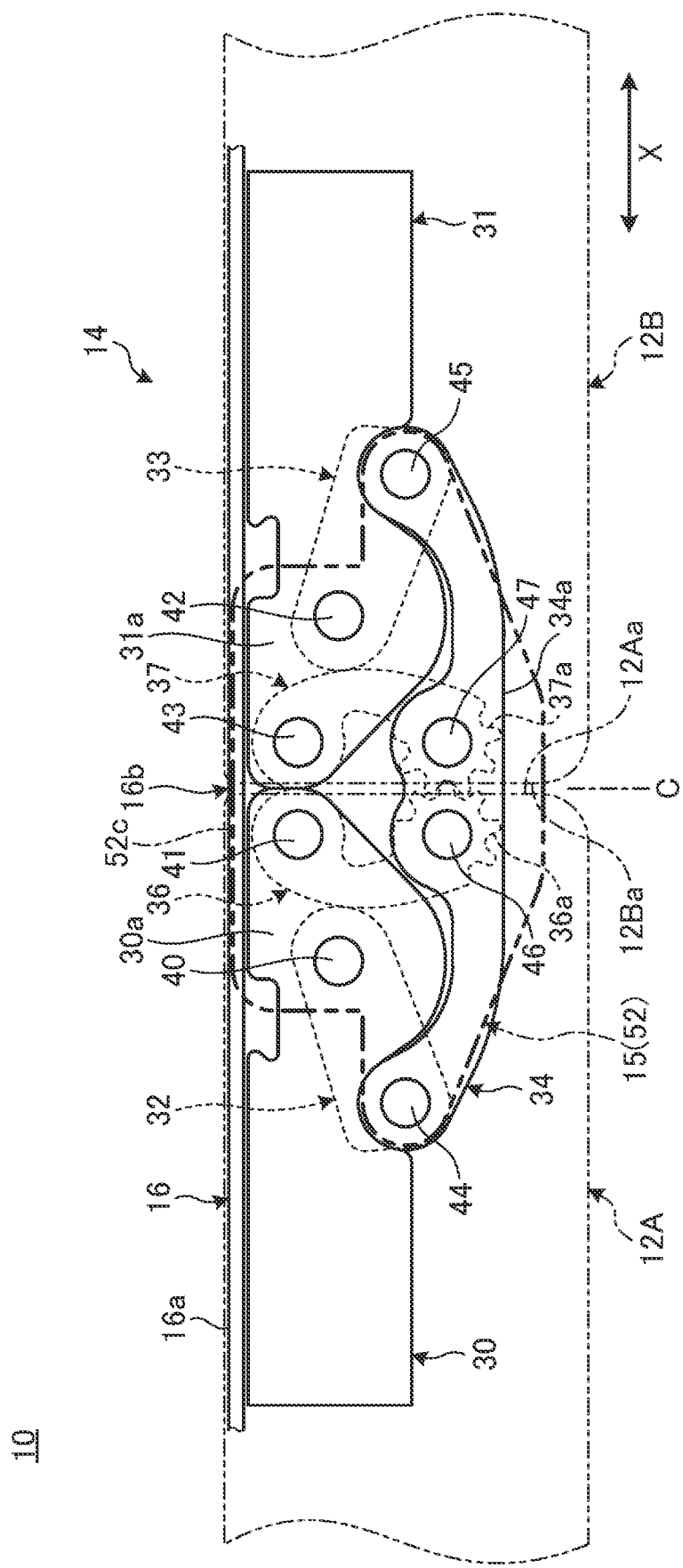
FIG. 7A is a side view schematically illustrating a state of the hinge device and the cover member in the usage form.
Figure 7B:
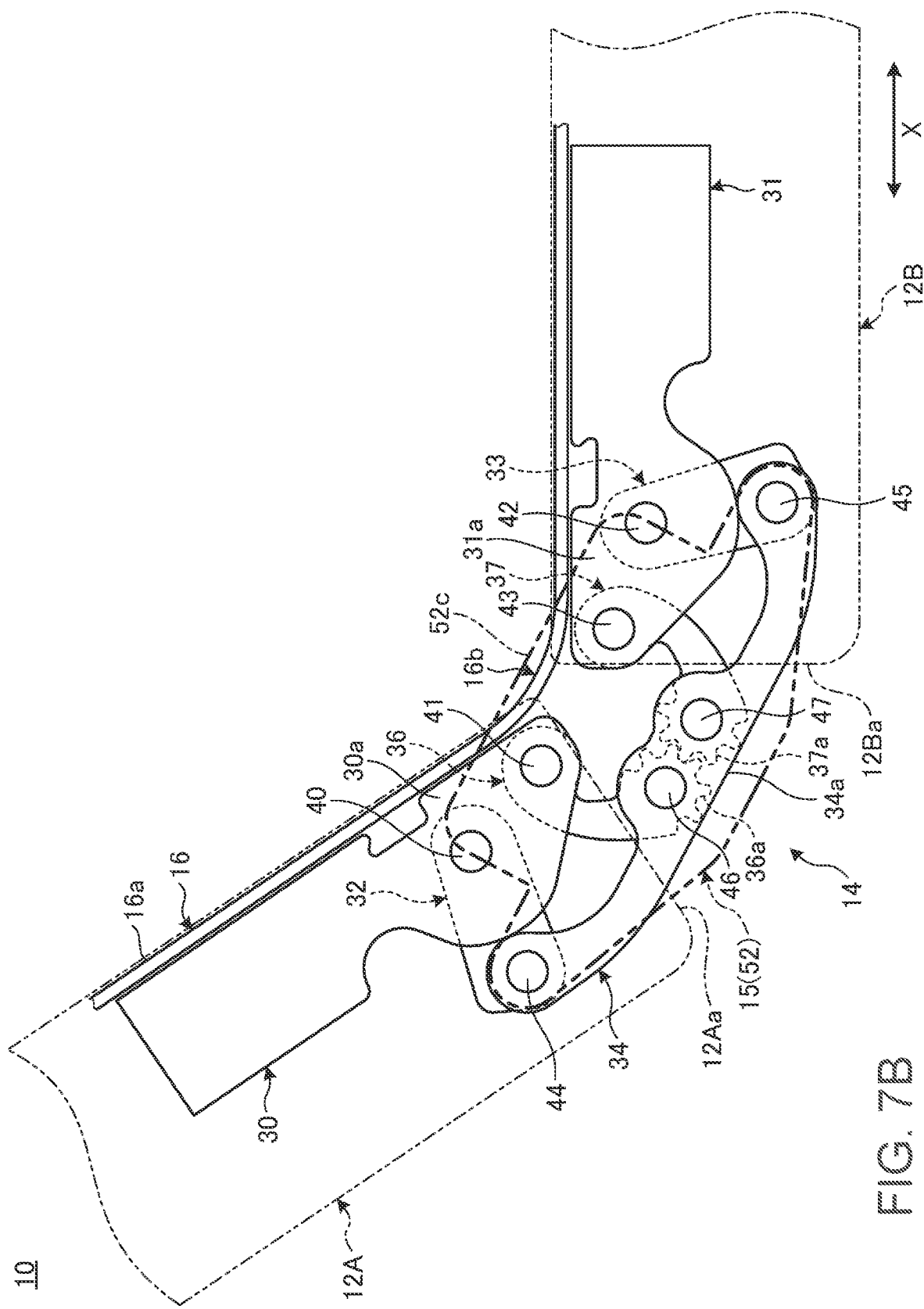
FIG. 7B is a side view schematically illustrating a state where the hinge device is operated so as to be folded from the state illustrated in FIG. 7A.
Figure 7C:
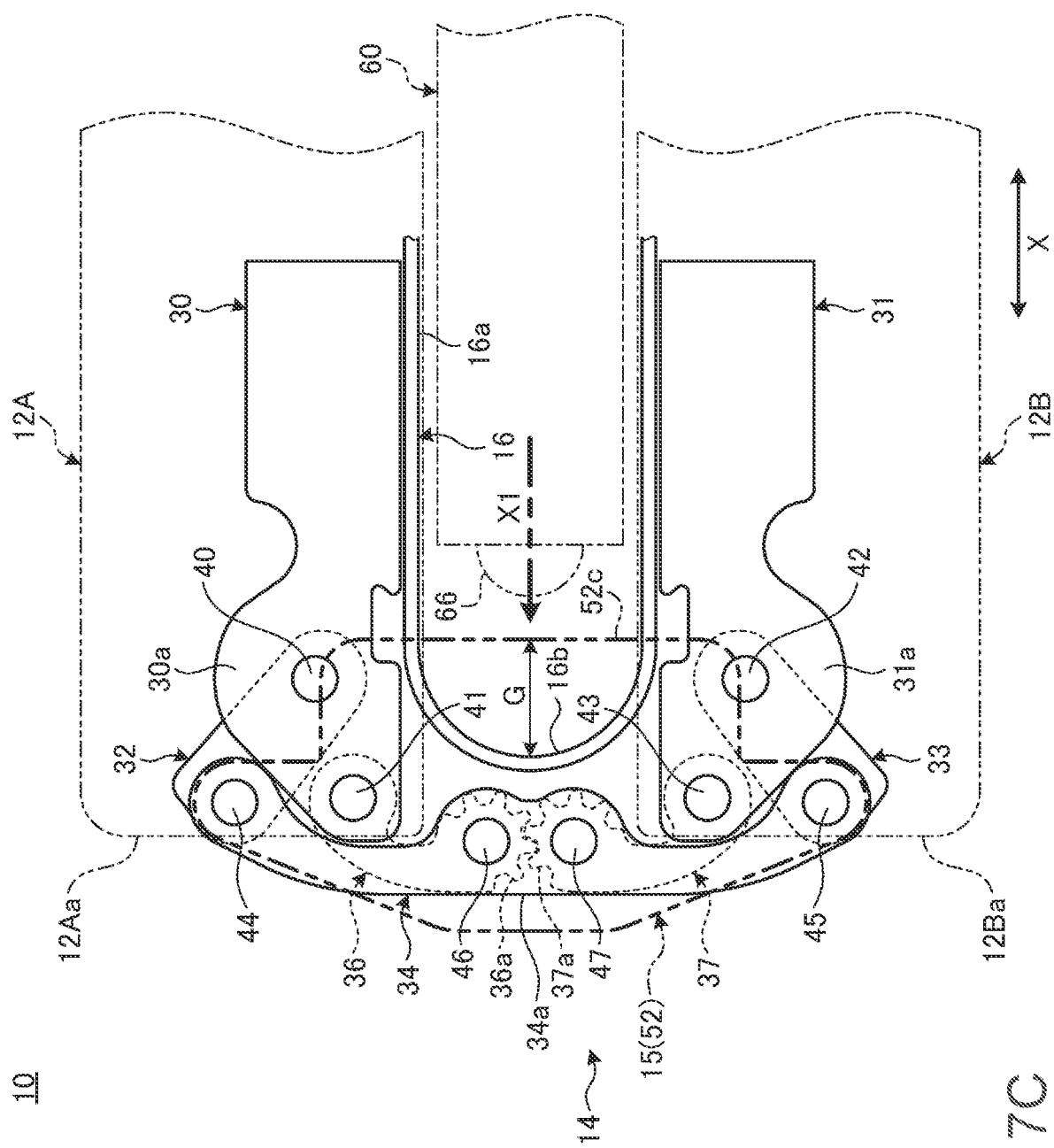
FIG. 7C is a side view schematically illustrating a state where the hinge device is further operated so as to be folded from the state illustrated in FIG. 7B into the storage form.

Next, specific examples of the configurations of the hinge device 14 and the cover member 15 are described. FIG. 4A is an exploded perspective view illustrating a state before the cover member 15 is attached to the hinge device 14. FIG. 4B is a perspective view enlarging the cover member 15 and its surrounding part in a state where the cover member is attached to the hinge device 14. FIG. 5 is a perspective view of the cover member 15. FIG. 6 is a schematic plan view enlarging the hinge device 14 at one end side in the Y direction and its surrounding part. FIG. 7A to FIG. 7C are views illustrating an operation of folding the hinge device 14 from the usage form to the storage form. FIG. 7A is a side view schematically illustrating a state of the hinge device 14 and the cover member 15 in the usage form. FIG. 7B is a side view schematically illustrating a state where the hinge device 14 is operated so as to be folded from the state illustrated in FIG. 7A. FIG. 7C is a side view schematically illustrating a state where the hinge device 14 is further operated so as to be folded from the state illustrated in FIG. 7B into the storage form.

As illustrated in FIG. 2 and FIG. 3, the hinge devices 14 are each disposed at a position which is a side of the outer peripheral edge portion of the display 16 and under the bezel member 20. The hinge device 14 according to the present embodiment rotates the chassis 12A and 12B so that the surface 16a of the display 16 can be always moved along a preset opening/closing track. A side of each hinge device 14 is covered by the cover member 15.

First, an example of the configuration of the hinge device 14 is described. As illustrated in FIG. 4A, FIG. 4B, and FIG. 7A, the hinge device 14 includes a first base plate 30, a second base plate 31, a first link arm 32, a second link arm 33, a coupling plate 34, a first gear arm 36, and a second gear arm 37. The hinge device 14 further includes a first bracket 38, and a second bracket 39. The hinge device 14 supports these respective elements through shafts 40 to 47 serving as rotation shafts. Hereinafter, a positional relationship among each element is described based on the configuration of the hinge device 14 in the usage form illustrated in FIG. 7A, unless otherwise described.

As illustrated in FIG. 3 and FIG. 4A, the first bracket 38 is a bracket for attaching the hinge device 14 to the second chassis 12B and is made of block-shaped metal. The first bracket 38 is screwed to the inner surface 12Bb through a plurality of fastening holes 38a formed at various locations, for example. The second bracket 39 is a bracket for attaching the hinge device 14 to the first chassis 12A and is made of block-shaped metal or resin. The second bracket 39 is screwed to the inner surface 12Ab through a plurality of fastening holes 39a formed at various locations, for example. The brackets 38 and 39 each have recessed portions 38b and 39b, respectively, at end faces facing each other. In the case of the present embodiment, some fastening holes 39a and some fastening holes 38a are used for attaching the support plates 22A and 22B, respectively.

As illustrated in FIG. 4B and FIG. 7A, the first base plate 30 is a thin metallic plate. A plurality of the first base plates 30 are provided side by side in a plate thickness direction at an interval equal to a plate thickness of the first link arm 32 or the first gear arm 36. The first link arm 32 and the first gear arm 36 are sandwiched in a slidable state between the adjacent first base plates 30 and 30. One end side of the first base plate 30 is fixed to the first bracket 38 within the recessed portion 38b and the other end side of the first base plate 30 projects outside the recessed portion 38b. The first base plate 30 has a distal end part 30a projecting outside the recessed portion 38b which part has a substantially tapered triangular shape in a side view. A first shaft 40 and a fifth shaft 41 are pivotally supported on the distal end part 30a. The fifth shaft 41 is provided in a tip of the distal end part 30a. The first shaft 40 is provided in a position closer to the first bracket 38 and a little lower than the fifth shaft 41. Shapes of the base plates 30 and 31 can be changed as necessary. The shafts 40 to 47 are each a metallic shaft, for example.

The second base plate 31 has a structure symmetrical to that of the first base plate 30. That is, one end side of the second base plate 31 is fixed to the second bracket 39 within the recessed portion 39b and the other end side of the second base plate 31 projects outside the recessed portion 39b. A plurality of the second base plates 31 are also provided side by side in a plate thickness direction at an interval equal to a plate thickness of the second link arm 33 or the second gear arm 37. The second link arm 33 and the second gear arm 37 are sandwiched in a slidable state between the adjacent second base plates 31 and 31. A second shaft 42 and a seventh shaft 43 are pivotally supported on a distal end part 31a of the second base plate 31 projecting outside the recessed portion 39b. The arrangement of each of the shafts 42 and 43 is also symmetrical to that of each of the shafts 40 and 41 in the first base plate 30.

The first link arm 32 is a thin metallic plate. A plurality of the first link arms 32 are provided side by side in a plate thickness direction at an interval equal to a plate thickness of the first base plate 30. The first link arm 32 is a rectangular plate and gradually slopes downward from a first end portion on the first shaft 40 side toward a second end portion on the opposite side. Shapes of the link arms 32 and 33 can be changed as necessary. The first link arm 32 is disposed side by side with the first gear arm 36 in the same plane and is sandwiched between the adjacent first base plates 30 and 30. The first end portion of the first link arm 32 on one edge portion 12Aa side is rotatably connected to the first base plate 30 through the first shaft 40. The second end portion of the first link arm 32 on the opposite side to the first end portion is rotatably connected to the coupling plate 34 through a third shaft 44. That is, the first link arm 32 connects the coupling plate 34 to be movable relatively to the first base plate 30 fixed to the first chassis 12A through the first bracket 38.

The second link arm 33 has a structure symmetrical to that of the first link arm 32. That is, a first end portion of the second link arm 33 is rotatably connected to the second base plate 31 through the second shaft 42 and a second end portion of the second link arm 33 is rotatably connected to the coupling plate 34 through the fourth shaft 45. That is, the second link arm 33 connects the coupling plate 34 to be movable relatively to the second base plate 31 fixed to the second chassis 12B through the second bracket 39. A plurality of the second link arms 33 are also provided side by side in a plate thickness direction at an interval equal to a plate thickness of the second base plate 31.

The coupling plate 34 is a metallic plate connecting the link arms 32 and 33 on the left and right sides. The coupling plate 34 is curved and substantially dish-shaped in a side view. An outer peripheral end surface 34a (bottom end surface in FIG. 7A) of the coupling plate 34 is disposed along the inner surface of the backbone member 18 in the storage form illustrated in FIG. 1. The coupling plate 34 is disposed in the same plane as each of the base plates 30 and 31 and is located under each of the base plates 30 and 31. A plurality of the coupling plates 34 are provided side by side in a plate thickness direction at an interval equal to a plate thickness of the first link arm 32 or the second link arm 33. A first end portion of the coupling plate 34 is rotatably connected to the first link arm 32 through the third shaft 44. A second end portion of the coupling plate 34 on the opposite side to the first end portion is rotatably connected to the second link arm 33 through the fourth shaft 45. A sixth shaft 46 and an eighth shaft 47 provided side by side on the left and right sides across the bending center C, are pivotally supported on the center portion of the coupling plate 34.

The first gear arm 36 is a metallic plate. The first gear arm 36 is substantially glasses-shaped in a side view. The first gear arm 36 extends vertically along an end surface of the one edge portion 12Aa of the first chassis 12A. The first gear arm 36 is disposed side by side with the first link arm 32 in the same plane and is sandwiched in a slidable state between the adjacent first base plates 30 and 30. The first gear arm 36 is located closer to the one edge portion 12Aa side than the first link arm 32. A plurality of the first gear arms 36 are provided side by side in a plate thickness direction at an interval equal to a plate thickness of the first base plate 30. A top end portion of the first gear arm 36 is rotatably connected to the first base plate 30 through the fifth shaft 41. A bottom end portion of the first gear arm 36 is rotatably connected to the coupling plate 34 through the sixth shaft 46. The first gear arm 36 has a first gear 36a on a circumferential end surface formed around the sixth shaft 46.

The second gear arm 37 has a structure symmetrical to that of the first gear arm 36. That is, a top end portion of the second gear arm 37 is rotatably connected to the second base plate 31 through the seventh shaft 43, and a bottom end portion of the second gear arm 37 is rotatably connected to the coupling plate 34 through the eighth shaft 47. A plurality of the second gear arms 37 are provided side by side in a plate thickness direction at an interval equal to a plate thickness of the second base plate 31. The second gear arm 37 has a second gear 37a on a circumferential end surface formed around the eighth shaft 47. The second gear 37a engages with the first gear 36a.

The first gear arm 36 and the second gear arm 37 synchronously rotate under the engaging action of each of the gears 36a and 37a. That is, when the first gear arm 36 rotates in the counterclockwise direction around the sixth shaft 46 as an axis of rotation from the state illustrated in FIG. 7A, for example, the second gear arm 37 rotates in the clockwise direction around the eighth shaft 47 as an axis of rotation, and thus both rotation operations are synchronized. Thus, the first gear arm 36 and the second gear arm 37 form a mechanism which synchronizes operations of each element (the first base plate 30 or the first link arm 32) on the first chassis 12A side and each element (the second base plate 31 or the second link arm 33) on the second chassis 12B side of the hinge device 14.

Thus, the hinge device 14 has a laminated structure in which a plurality of the first base plates 30 and the left halves of the coupling plates 34 are arranged side by side and the first link arms 32 and the first gear arms 36 are sandwiched between them, on the first chassis 12A side. The hinge device 14 has a laminated structure in which a plurality of the second base plates 31 and the right halves of the coupling plates 34 are arranged side by side and the second link arm 33 and the second gear arm 37 are sandwiched between them, on the second chassis 12B side. Then, the shafts 40 to 47 each penetrate through these laminated base plates 30 and 31, link arms 32 and 33, coupling plates 34, and gear arms 36 and 37 in a laminated direction and support them. In addition, it is a matter of course that shapes of the respective elements of the hinge device 14, that is, the base plates 30 and 31, the link arms 32 and 33, the coupling plate 34, the gear arms 36 and 37, and the brackets 38 and 39 may be changed as necessary.

Next, an example of the configuration of the cover member 15 is described.

As illustrated in FIG. 4A, FIG. 4B, and FIG. 5, the cover member 15 is a cap-shaped member for covering a side of each hinge device 14. The cover member 15 is made of metallic material or resin material, for example. The cover member 15 is attached to an outer side (top side in FIG. 3) of the hinge device 14 on one end side (top end side in FIG. 3) in the Y direction. The cover member 15 is attached to an outer side (bottom side in FIG. 3) of the hinge device 14 on the other end side (bottom end side in FIG. 3) in the Y direction. That is, the cover member 15 covers an outside of each hinge device 14. Thus, the cover members 15 cover both sides in the Y direction between the one edge portions 12Aa and 12Ba separated in the storage form (refer to FIG. 1). The cover member 15 has an attaching part 50 and a cover plate part (plate piece) 52. Although the cover plate parts of the cover members 15 are slightly displaced in conjunction with the opening and closing operation of the portable information device 10 as mentioned below, they have only to cover at least a part of the outsides of the hinge devices 14 on both sides of the one edge portions 12Aa and 12Ba.

The attaching part 50 is a part for mounting the cover member 15 to the hinge device 14. The attaching part 50 has a fork shape facing upward and has a pair of fitting recessed portions 50*a* and 50*b* arranged in the X direction, for example. The fitting recessed portions 50*a* and 50*b* are each inserted into gaps between the coupling plates 34 from bottom up and are externally fitted to the shafts 46 and 47, respectively. Thus, the attaching part 50 is attached to the hinge device 14 and integrally formed with the coupling plate 34. A bridge plate 54 extending toward the cover plate part 52 in the Y direction is provided at the bottom end portion of the attaching part 50. The bridge plate 54 extends along the outer peripheral end surface 34*a* of the coupling plates 34 arranged in the Y direction. The attaching part 50 suffices if the cover member 15 can be mounted to the hinge device 14, and the shape or configuration thereof, an attachment position to the hinge device 14 or the like can be changed as necessary.

The cover plate part 52 is provided at an end of the bridge plate 54 and stands in the side of the hinge device 14. The cover plate part 52 has a shape corresponding to a gap between the left and right brackets 38 and 39, for example, and covers most of elements of the hinge device 14 exposed from this gap (refer to FIG. 4A and FIG. 4B). That is, the cover plate part 52 is disposed laterally to the base plates 30 and 31, the link arms 32 and 33, and the coupling plates 34. In the case of the present embodiment, the cover plate part 52 has a downward arrow shape, for example, and has plate parts 52*a* and 52*b*. The plate part 52*a* is a lower substantially trapezoidal part where the bridge plate 54 is provided. The plate part 52*b* is a substantially rectangular part upper than the plate part 52*a*.

As illustrated in FIG. 6, the side plate 17 of the first chassis 12A has a notch-shaped portion 17*a* opened toward the one edge portion 12Aa. The side plate 17 of the second chassis 12B has a notch-shaped portion 17*b* opened toward the one edge portion 12Ba. The notch-shaped portions 17*a* and 17*b* have a shape obtained by cutting out inside corners of the side plate 17 facing the one edge portions 12Aa and 12Ba and are in communication with each other. In the usage form, the plate part 52*b* of the cover plate part 52 is disposed in the notch-shaped portions 17*a* and 17*b*. Thus, the cover plate part 52 is not exposed to an outer surface of the side plate 17 or does not bulge outside this outer surface.

Next, with reference to FIG. 7A to FIG. 7C, an operation of rotating the portable information device 10 from the usage form to the storage form is described. The cover member 15 is illustrated by a virtual line in FIG. 7A to FIG. 7C. In the hinge device 14, the first base plate 30 and the second base plate 31 are disposed in parallel side by side in the X direction in the usage form illustrated in FIG. 7A. In this state, the coupling plate 34 is in the uppermost position where its left and right both ends are pulled up by the link arms 32 and 33, respectively. Therefore, the hinge device 14 is made thinner in the usage form with the coupling plate 34 approaching closest to the bottom end portions of the respective base plates 30 and 31. Thus, the hinge device 14 is completely contained inside the chassis members 12A and 12B in a side view. In addition, the cover member 15 is completely contained inside the side plate 17 of the chassis members 12A and 12B. At this time, in the cover member 15, a tip surface 52*c* of the plate part 52*b* of the cover plate part 52 is disposed on substantially the same plane as a top end surface of the side plate 17, that is, the bezel member 20 or the surface 16*a* of the display 16. The tip surface 52*c* is in a bending direction of the display 16 in the plate part 52*b*.

Next, when the portable information device 10 is changed from the usage form (180° position) to the storage form (0° position) illustrated in FIG. 7C, for example, the chassis members 12A and 12B are each grasped by left and right hands, respectively, and are folded in a direction of closing the display 16. Then, as illustrated in FIG. 7A and FIG. 7B, the coupling plate 34 is subject to a force to separate the shafts 44 and 45 on both left and right ends and a rotating force according to an angle between the chassis members 12A and 12B. As a result, the first link arm 32 rotates in the counterclockwise direction around the first shaft 40 as an axis of rotation in FIG. 7A, and at the same time, the second link arm 33 rotates in the clockwise direction around the second shaft 42 as an axis of rotation in FIG. 7A. As a result, a horizontal central part and its surrounding part of the coupling plate 34 are pushed out in a direction of separating from the base plates 30 and 31. At this time, the cover member 15 also integrally operates with the coupling plate 34.

In the hinge device 14, since the coupling plate 34 moves in a direction of escaping from the display 16 in the rotating/folding operation, interference between both is prevented. The cover plate part 52 of the cover member 15 is disposed laterally to the display 16. Thus, the tip surface 52*c* gradually moves from a lateral side of the display 16 so as to project beyond the surface 16*a*.

In this rotating operation, the gear arms 36 and 37 each rotate in synchronization in opposite directions by the engaging action of the mutual gears 36*a* and 37*a*. Thus, the operation of the coupling plate 34 can be evenly maintained with respect to the left and right chassis members 12A and 12B and the chassis members 12A and 12B can be rotated with high stability. Since the hinge device 14 has a laminated structure in which a plurality of the base plates 30 and 31 are each arranged side by side and the link arms 32 and 33 and the gear arms 36 and 37 are each sandwiched between them, the hinge device 14 can generate a predetermined rotation torque by slide resistance.

When the display 16 is further folded in the closing direction, the portable information device 10 is turned into the storage form by the action of the hinge device 14 illustrated in FIG. 7C. The hinge device 14 in the storage form is configured so as not to interfere with the display 16 while being made thinner in the X direction.

In this storage form, the cover member 15 is in a state where the cover plate part 52 covers at least a part of a side of the gap formed by the separation of the one edge portions 12Aa and 12Ba of the chassis members 12A and 12B. At this time, the cover plate part 52 is at a position where its tip surface 52*c* projects inwards beyond the surface 16*a* of the display 16 in a side of the display 16. Specifically, the tip surface 52*c* of the cover plate part 52 is at a position where it projects to an inner side (right side in FIG. 7C) in the bending direction of the display 16 than the surface 16*a* of the bending part (bending region 16*b*) formed in a circular arc shape, of the display 16 (in other words, as the first chassis 12A and the second chassis 12B are rotated, the tip surface of the cover plate piece 52 projects to the inner side in the bending direction of the display 16 than the surface 16*a* of the bending part of the display 16). Thus, in the storage form, both sides of the gap between the one edge portions 12Aa and 12Ba of the chassis members 12A and 12B are covered by the cover members 15. In the storage form, the cover plate part 52 also covers up a side of the bezel member 20 interposed in the gap between the one edge portions 12Aa and 12Ba.

Figure 8:
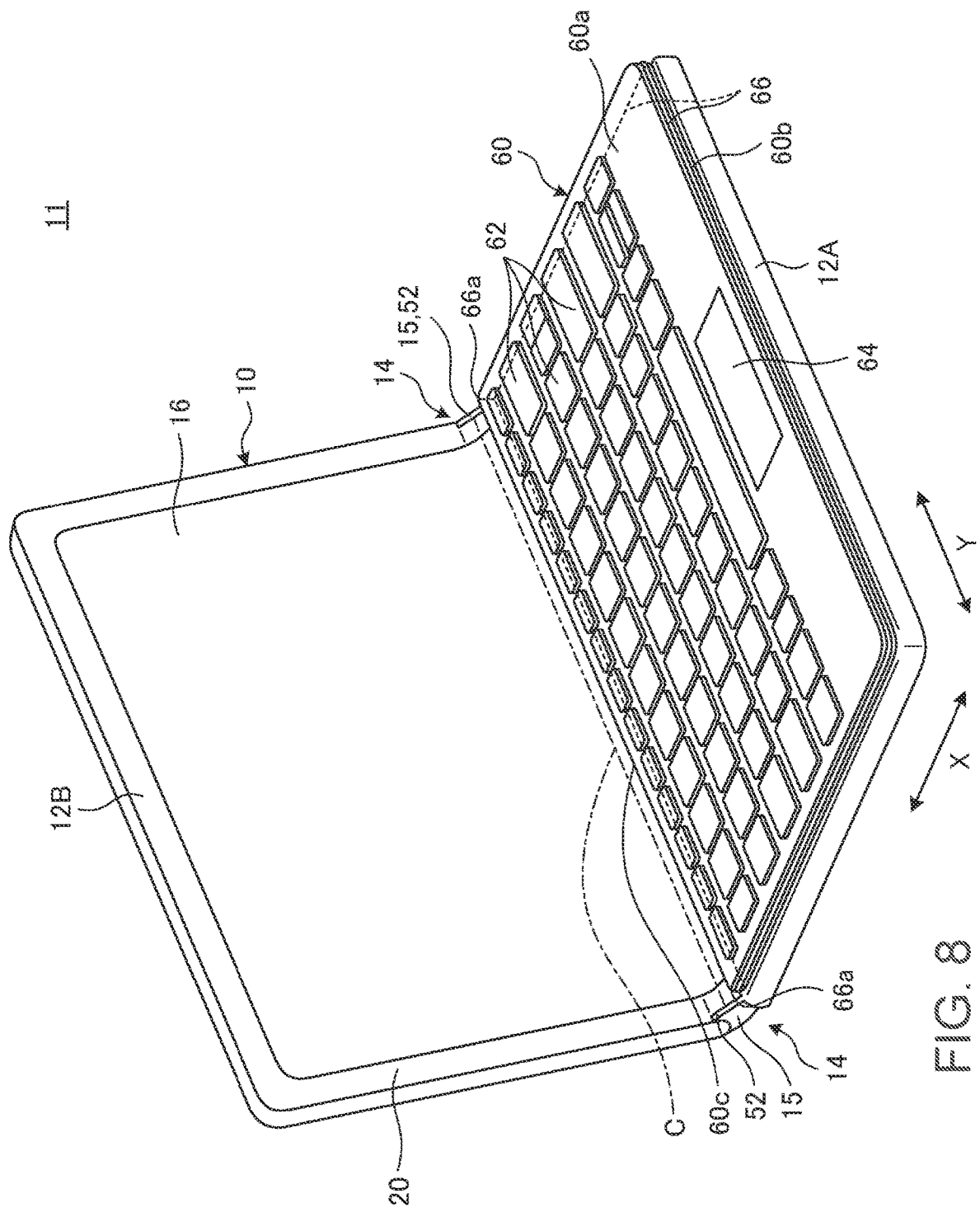
FIG. 8 is a perspective view of an information device system according to one embodiment of the present invention.

Next, described is the keyboard (input device) 60 which is used in combination with the above-described portable information device 10. FIG. 8 is a perspective view of the information device system 11 according to one embodiment of the present invention. As described above, the information device system 11 has the portable information device 10 and the keyboard 60. The keyboard 60 is located in a sub-device that is used in combination with the portable information device 10 as a main device. In FIG. 8, the keyboard 60 is placed at a usage position specified by a top surface of the first chassis 12A. This state is referred to as a placement state of the keyboard 60.

When the keyboard 60 is in the placement state on the top surface of the first chassis 12A, it is of substantially the same shape as the first chassis 12A in a plan view (refer to FIG. 2). The keyboard 60 is positioned at the usage position with respect to the first chassis 12A by a magnet that is not illustrated. The magnet is provided in, for example, both the keyboard 60 and the first chassis 12A, and they are attracted to each other by opposite magnetic poles.

When the keyboard 60 is in the placement state, wireless communication and wireless charging between the keyboard 60 and the portable information device 10 are performed. Therefore, the keyboard 60 in the placement state is fixed in place, and it becomes possible to enter keys and charge without any particular electrical connection operation. The keyboard 60 is fixed by the positioning magnet with moderate magnetic force and thus is easily manually removed. It is to be noted that even if the keyboard 60 is disposed at a position different from the placement state, it can wirelessly communicate with the main device 10 as long as it is within a predetermined distance.

Figure 9:
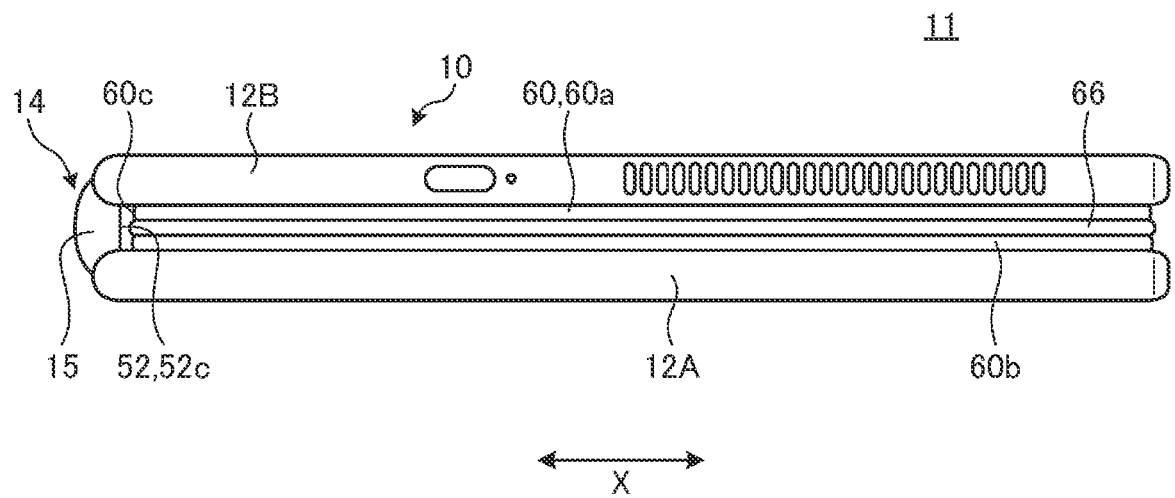
FIG. 9 is a side view illustrating the portable information device in the storage form and a keyboard held between a first chassis and a second chassis.

FIG. 9 is a side view illustrating the portable information device 10 in the storage form and the keyboard 60 held between the first chassis 12A and the second chassis 12B. As illustrated in FIG. 9, when the portable information device 10 is folded by the rotation of the first chassis 12A and second chassis 12B while the keyboard 60 is kept in the placement state on the top surface of the first chassis 12A, the keyboard 60 can be held between the first chassis 12A and the second chassis 12B. With this, the keyboard 60 can obtain preferable portability integrated with the portable information device 10. At this time, the keyboard 60 never protrudes from the first chassis 12A and the second chassis 12B and thus the information device system 11 is maintained compact. In addition, since the keyboard 60 is held between the first chassis 12A and the second chassis 12B, they are parallel in the X direction and orderly in appearance, and thus are preferable in design.

Figure 10:
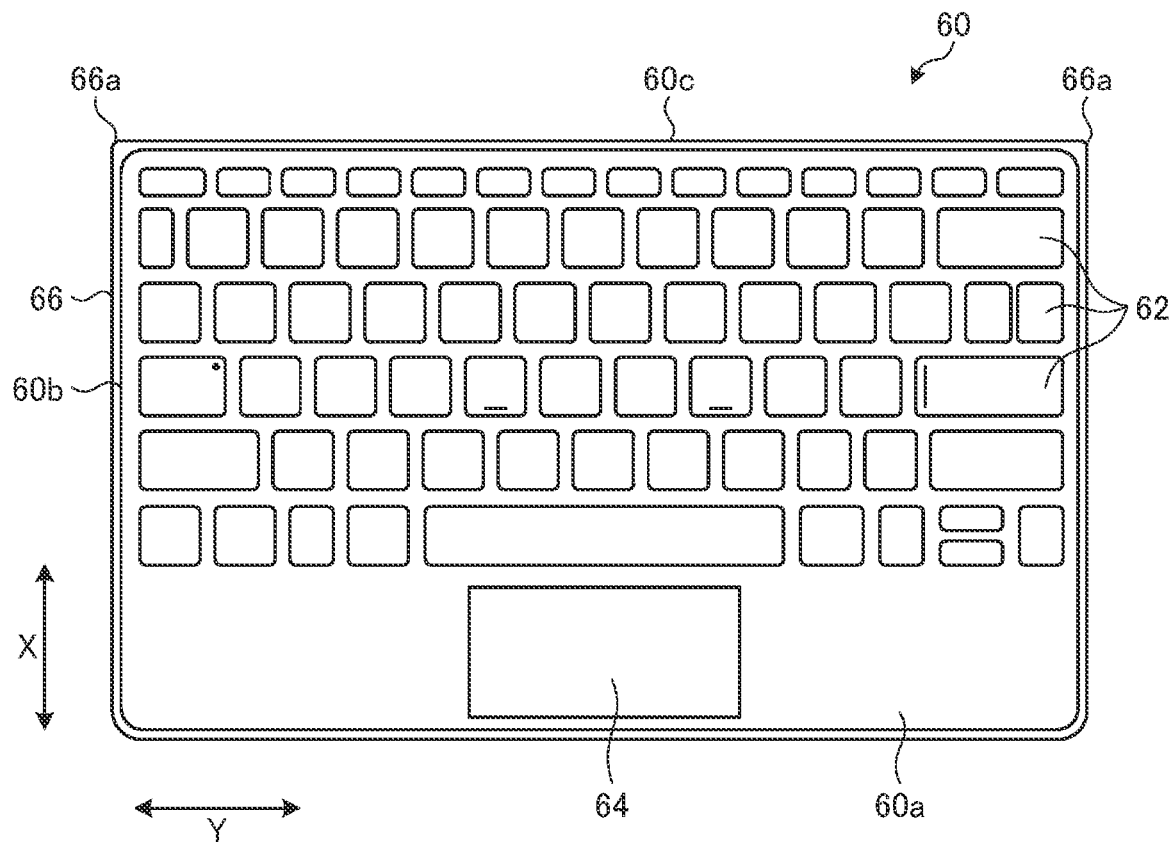
FIG. 10 is a plan view of the keyboard.
Figure 11:
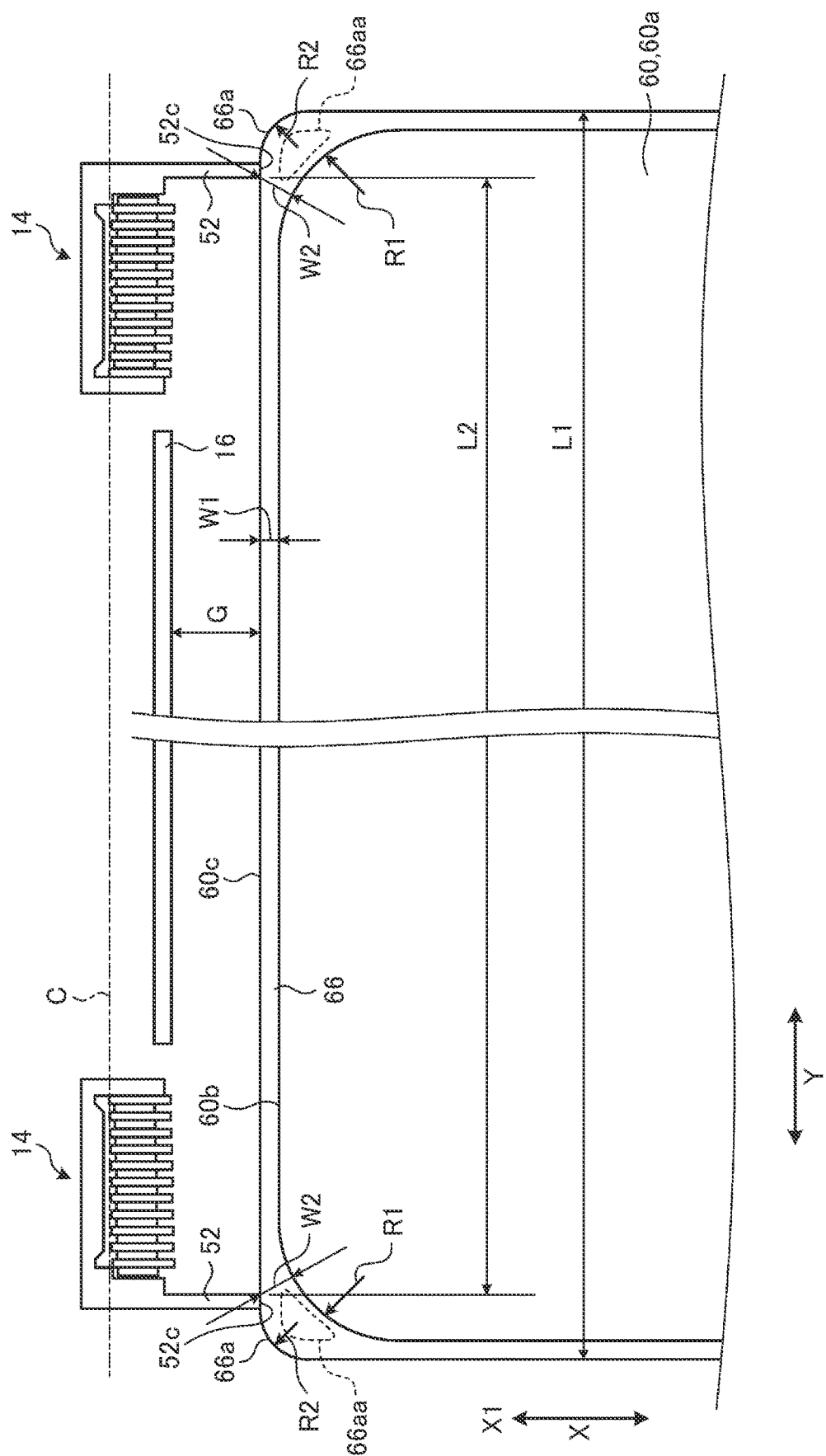
FIG. 11 is a partially enlarged plan view of the keyboard.

FIG. 10 is a plan view of the keyboard 60. FIG. 11 is a partially enlarged plan view of the keyboard 60. As illustrated in FIG. 8 and FIG. 10, the keyboard 60 has a thin plate shape, and has a plurality of keys 62 provided on its top surface, a touch pad 64 provided on the near side of the top surface, and an elastic member 66 provided along a peripheral surface 60b of a body 60a of the keyboard 60. The keyboard 60 may be provided with, for example, a small tilt-direction-sensitive pointing device, in addition to the touch pad 64.

The elastic member 66 is softer than the body 60a, and is made of a resin elastic material such as rubber or silicon rubber. The body 60a is made of a resin material or a magnesium alloy material, for example. When the elastic member 66 is provided over the entire peripheral surface 60b, it serves as a cushion against another object, which is preferable. However, when a connector etc. is provided on the peripheral surface 60b, the elastic member 66 may be provided over the entire peripheral surface 60b excluding the location where the connector etc. is provided.

When the elastic member 66 is provided at least over the entire length of a rear edge 60c of the body 60a along the one edge portions 12Aa and 12Ba based on the placement state, damage to the display 16 can be substantially reduced. In this regard, a side far away from a user (the side close to the bending center C) when the keyboard 60 is in the placement state, is defined as the rear edge 60c.

The elastic member 66 is formed to be thicker at corner parts 66a that is opposed to a pair of the cover plate parts 52 than in other locations. Specifically, as illustrated in FIG. 11, a curvature radius R2 of the elastic member 66 at the corner parts 66a on both ends of the rear edge 60c, is configured to be smaller than a curvature radius R1 of the body 60a. With this, the corner part 66a can be thickened by a simple configuration. In addition, although the corner part 66a is formed to be thick, it never projects in an X1 direction in FIG. 11.

Assuming that the corner part 66a is displaced in the X1 direction to abut against the cover plate part 52, a distance W2 between the tip surface 52c of the cover plate part 52 and the body 60a is about 2 mm, for example. In contrast, a projecting width W1 of the elastic member 66 from the peripheral surface 60b is, for example, about 0.5 mm at locations other than the corner parts 66a, which can reduce an X directional width and Y directional width.

The keyboard 60 has a width L1 in a direction (i.e., Y direction) along the one edge portions 12Aa and 12Ba and the bending center C based on the placement state, the width L1 being larger than an interval L2 at which a pair of the cover plate parts 52 is provided, and is provided with the elastic member 66 at least at the corner parts 66a.

A hollow part 66aa is formed in the corner part 66a of the elastic member 66. The hollow part 66aa is a bottomed hole that is opened only on a bottom surface side. The hollow part 66aa has a triangular shape that is substantially along a circular arc in a corner edge of the elastic member 66 and a circular arc in a corner edge of the body 60a in a plan view. This hollow part 66aa makes the corner part 66a even softer and thus improves cushioning performance. A top surface of the hollow part 66aa is closed, which is preferable in design.

Figure 12:
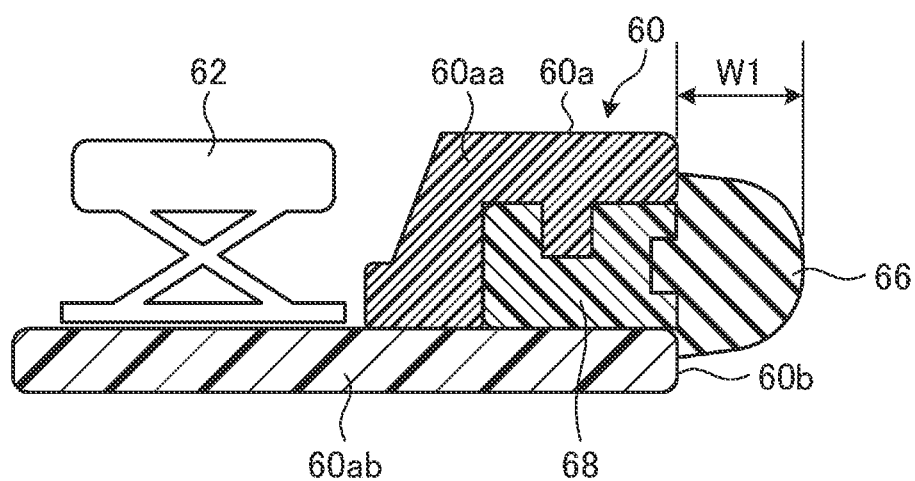
FIG. 12 is a partially enlarged cross-sectional side view of the keyboard.

FIG. 12 is a partially enlarged cross-sectional side view of the keyboard 60. As illustrated in FIG. 12, the elastic member 66 is formed integrally with a base member 68 so that their recessed portion and protruding portion are engaged, which ensures strength. The base member 68 is a resin member that has moderate strength. The base member 68 is sandwiched and fixed by a top plate 60aa and a bottom plate 60ab of the body 60a and stabilized.

According to the embodiment as described above, as the first chassis 12A and the second chassis 12B of the portable information device 10 rotate, a pair of the cover plate parts 52 projects, and the keyboard 60 is provided with the elastic member 66 at least at the corner part 66a opposed to the pair of the cover plate parts 52. Therefore, even if the keyboard 60 is moved in a direction of approaching the bending center C (X1 direction in FIG. 11) by some impact force, the elastic member 66 abuts against the tip surface 52c of the cover plate part 52 since the cover plate part 52 projects. Between the keyboard 60 and the display 16, a gap G (refer to FIG. 7C and FIG. 11) is secured, and the keyboard 60 never directly abuts against the display 16. Furthermore, since the impact force is mitigated by the elastic member 66, the keyboard 60 never damages the display 16. In addition, the corner part 66*a* is very elastic since it is formed to be thicker than other parts of the elastic member 66 and is provided with the hollow part 66*aa*, which can further reduce the impact force. Further, the elastic member 66 mitigates the impact force both on the portable information device 10 and on the keyboard 60.

Figure 13:
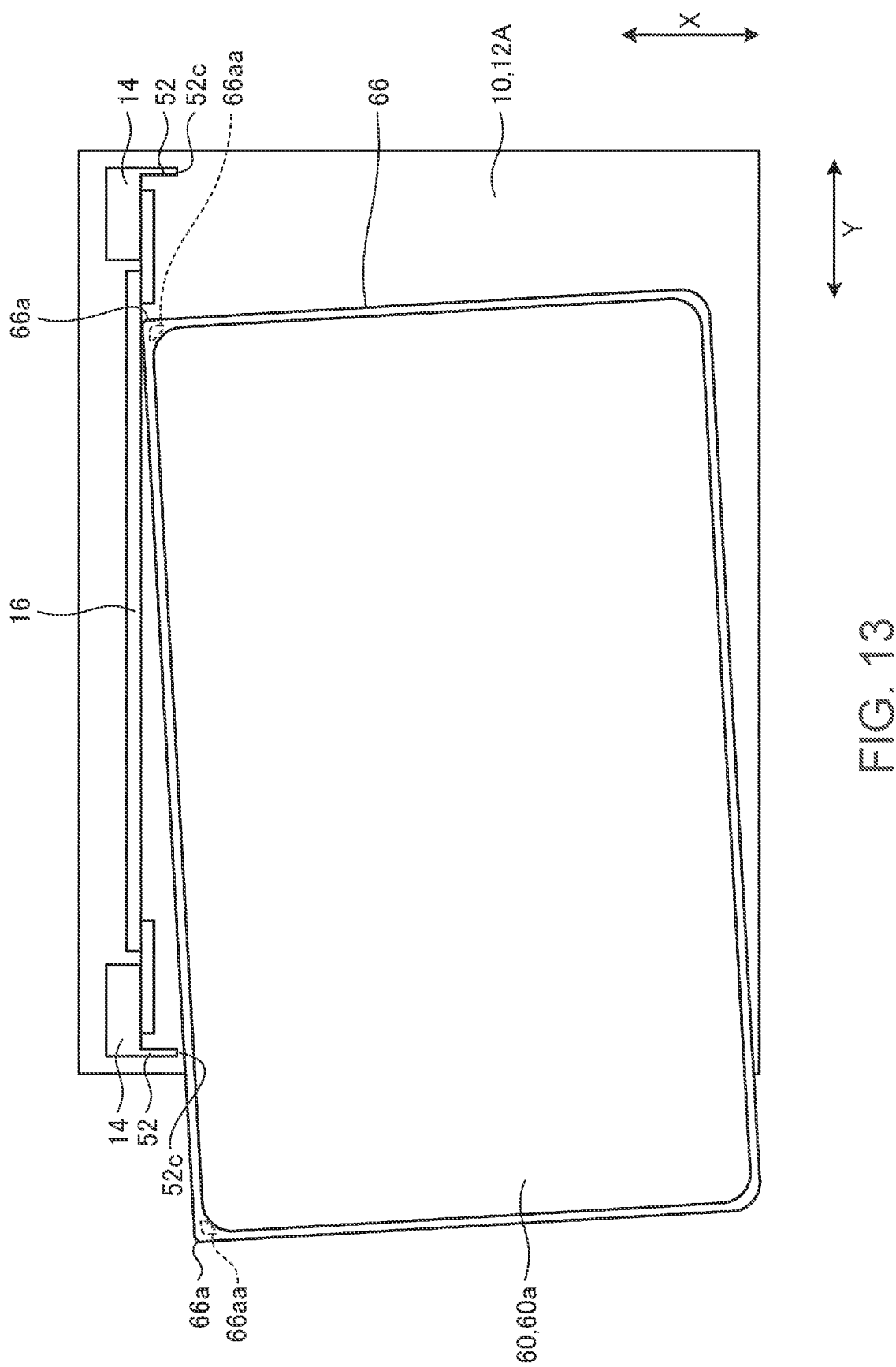
FIG. 13 is a diagram showing a positional relationship between the keyboard and the portable information device when the keyboard is displaced laterally while being inclined.

FIG. 13 is a diagram showing a positional relationship between the keyboard 60 and the portable information device 10 when the keyboard 60 is displaced laterally (in the Y direction) while being inclined. As illustrated in FIG. 13, when the keyboard 60 is displaced laterally while being inclined by some factors, the corner part 66*a* can abut against the display 16, however, the corner part 66*a* is a part of the elastic member 66 and thus elastic. Furthermore, the corner part 66*a* is more elastic since it is formed to be thicker than other parts and is provided with the hollow part 66*aa*, and thus it never damages the display 16.

It is to be noted that although the elastic member 66 is basically to protect the portable information device 10 and the display 16 against which the display 16 can abut, it also has a function of protecting the keyboard 60 itself, for example, when the keyboard 60 is dropped alone. The input device, which is used in combination with the portable information device 10, is not limited to the keyboard 60 but may be a pen tablet, for example. The cover plate part 52 only has to be configured that its tip surface 52*c* projects to the inner side in the bending direction than the surface 16*a* of the bending part, and thus needs not be a simple single plate. Although the specified usage position of the keyboard 60 is the top surface of the first chassis 12A in the above description, it may be the top surface of the second chassis 12B or may be both of them.

It is a matter of course that the present invention is not limited to the embodiments described above and can be freely altered without deviating from the scope of the present invention.

The invention claimed is:

1. An information device system, comprising a main device to which a first chassis and a second chassis are connected, and a plate-shaped sub-device to be used in combination with the main device,
wherein the main device has:
a hinge configured to rotatably connect respective one edge portions of the first chassis and the second chassis;
a foldable display seamlessly covering the first chassis and the second chassis; and
a pair of plate pieces covering at least a part of an outside of the hinge at both sides of the one edge portions, the pair of plate pieces being contained in the first chassis and the second chassis in a state where a top surface of the first chassis and a top surface of the second chassis are in substantially the same plane, each tip surface of the plate pieces projects towards an inner side of the display as the first chassis and the second chassis rotate, and
the sub-device has:
a width along the one edge portions equal to or larger than an interval between the pair of plate pieces, based on a placement state of the sub-device being placed at a usage position specified by the top surface of the first chassis, and
an elastic member at locations opposed to the pair of plate pieces.

2. The information device system according to claim 1, wherein the elastic member is over an entire length of a rear edge of the sub-device along the one edge portions based on the placement state and is formed to be thicker at locations opposed to the pair of plate pieces than in other locations.

3. The information device system according to claim 2, wherein the sub-device is of substantially the same shape as the first chassis in a plan view, based on the placement state, and
both end corner parts of the rear edge are the locations opposed to the pair of the plate pieces, and a curvature radius of the elastic member at the both end corner parts is smaller than a curvature radius of a body of the sub-device.

4. The information device system according to claim 1, wherein the sub-device is positioned at the usage position by a magnet.

5. The information device system according to claim 1, wherein the elastic member has hollow parts at locations opposed to the pair of plate pieces.

6. The information device system according to claim 1, wherein the sub-device is held between the first chassis and the second chassis while in the placement state, when the first chassis and the second chassis rotate to fold the main device.

7. The information device system according to claim 1, wherein the sub-device is an input device configured to wirelessly communicate with the main device when it is in the placement state.

8. A plate-shaped input device to be used in combination with a main device to which a first chassis and a second chassis are connected,
the main device has:
a hinge configured to rotatably connect respective one edge portions of the first chassis and the second chassis;
a foldable display seamlessly covering the first chassis and the second chassis; and
a pair of plate pieces covering at least a part of an outside of the hinge at both sides of the one edge portions, the pair of plate pieces being contained in the first chassis and the second chassis in a state where a top surface of the first chassis and a top surface of the second chassis are in substantially the same plane, each tip surface of the plate pieces projects towards an inner side of the display as the first chassis and the second chassis rotate, and
a width along the one edge portions is equal to or larger than an interval between the pair of plate pieces, based on a placement state of the input device being placed at a usage position specified by the top surface of the first chassis of the main device, and
an elastic member is at locations opposed to the pair of plate pieces.

\* \* \* \* \*